United States Patent [19]

Chupka et al.

[11] 4,410,424

[45] Oct. 18, 1983

[54] SCREENING APPARATUS FOR PAPER MAKING STOCK

[75] Inventors: David E. Chupka; Peter Seifert, both of Middletown, Ohio

[73] Assignee: The Black Clawson Company, Middletown, Ohio

[21] Appl. No.: 357,016

[22] Filed: Mar. 11, 1982

Related U.S. Application Data

[63] Continuation-in-part of Ser. No. 145,654, May 2, 1980, Pat. No. 4,383,918.

[51] Int. Cl.$^3$ ............................................. B07B 1/20
[52] U.S. Cl. .................................... 209/273; 209/393
[58] Field of Search ............... 209/273, 305, 306, 393, 209/395, 406, 407; 210/415, 497.1, 498, 499

[56] References Cited

U.S. PATENT DOCUMENTS

| 4,017,387 | 4/1977 | Hatton et al. | 209/273 X |
| 4,155,841 | 5/1979 | Chupka et al. | 209/273 |
| 4,200,537 | 4/1980 | Lamort | 209/273 X |

Primary Examiner—Ralph J. Hill
Attorney, Agent, or Firm—Biebel, French & Nauman

[57] ABSTRACT

A screening cylinder for use in screening apparatus for paper making stock includes a reinforcing skeleton structure comprising multiple bars extending generally axially of the inside of the cylinder which are welded to relatively heavy reinforcing hoops located at both ends of the cylinder and at a plurality of uniformly spaced locations along the length of the cylinder. Between each adjacent pair of these hoops is a plurality of circular rings of metal rod material arranged in closely spaced relation with each other and with the hoops to define a corresponding plurality of circumferentially extending screening slots. This screening cylinder is specifically designed for use in screening apparatus characterized by a rotor comprising bars or vanes of air foil section moving in closely spaced but non-contacting relation with the radially inner surfaces of the axially extending bars for the purpose of creating alternating positive and negative pressure waves effective to prevent plugging of the slots in the screening cylinder.

5 Claims, 4 Drawing Figures

SCREENING APPARATUS FOR PAPER MAKING STOCK

RELATED APPLICATION

This application is continuation-in-part of application Ser. No. 145,654, filed May 2nd 1980, now U.S. Pat. No. 4,383,918, issued May 17, 1983.

BACKGROUND OF THE INVENTION

Paper mills have for many years made extensive use, for the cleaning of paper making stock, of screening apparatus embodying a cylindrical perforated screening member defining supply and accepts chambers on the opposite sides thereof in a closed housing, and including a rotor member which operates in one of the chambers to keep the screening perforations open and free from solid material tending to cling to the screening surface. Commonly, the stock or furnish is delivered to the supply chamber adjacent one end of the screening cylinder, and the material rejected by the screening cylinder is collected and discharged from the opposite end of the supply chamber.

The assignee of this invention has manufactured and sold many such screens in accordance with a series of U.S. Pat. Nos., commencing with Staege 2,347,716, and followed by Martindale 2,835,173, Seifert 3,849,302 and 4,105,543, and Chupka-Seifert 4,155,841. Starting with the construction shown in the Martindale patent, all such screens manufactured and sold by applicant's assignee have been characterized by a rotor comprising bars or vanes of airfoil section moving in closely spaced but non-contacting relation with the surface of the screening cylinder for the purpose of creating alternating positive and negative pressure waves effective to prevent plugging of the perforations in the screening cylinder.

The art has experimented widely with detailed variations in screens of the above type, including variations in the vane shape and other forms of rotor, and also in the size, configuration, and spacing of the perforations in the screening cylinder. Thus since the advent of the Staege patent in the mid-1940's, many screening cylinders have been fabricated with multiple uniformly cylindrical drilled perforations, which commonly range in diameter from approximately 0.050 inch to 0.125 inch.

In more recent years, the trade has been offered pressure screens generally of the above type wherein the perforations in the screening cylinder are elongated slots rather than round holes, with the slots running either cicumferentially or axially of the cylinder. Typical such constructions are shown in Lamort U.S. Pat. No. 3,617,008, Holz U.S. Pat. No. 3,581,983, and the above noted Seifert '302 and Chupka-Seifert patents.

Both of the Lamort and Chupka-Seifert patents also show, in addition to slotted cylinders, a plurality of shoulders or small bars running generally axially of the screen cylinder in circumferentially spaced relation around the inlet side of the cylinder, and both also show the rotor vanes on the inlet side of the cylinder. This arrangement is described by Lamort as preventing clogging of the screening slots by fiber, albeit in an undescribed manner. In the Chupka-Seifert patent, the purpose of the bars is described as to generate a field of high intensity, fine scale turbulence in the stock adjacent the inlet side of the screen cylinder and thereby to effect screening of paper fiber stock with minimum fractionation thereof on the basis of fiber length.

The disclosure of the Chupka-Seifert patent is limited to screening cylinders provided with circumferentially extending slots of a width range of only 0.001–0.008 inch. The later Chupka-Seifert application Ser. No. 145,654 filed May 2, 1980, of which the present case is a continuation-in-part, discloses the use of a similar multi-bar arrangement in a screening cylinder having circumferentially extending slots of a substantially greater range of widths, i.e. as wide as 0.030 inch although the preferred width range is stated to be 0.014–0.022 inch, with resulting increase in the capacity of the screen in terms of both tonnage per unit of time and the power requirements per unit of accepted fiber.

SUMMARY OF THE INVENTION

The present invention is especially concerned with screens generally of the construction disclosed in the above-noted Chupka-Seifert patent and application, and more specifically to the construction of the individual screening cylinders for use in the screens disclosed in that patent and application.

The Chupka-Seifert patent and application teach that the preferred form of screening cylinder for use therein is constructed of multiple rings of wire of generally triangular section, which are assembled and held in axially spaced relation to define screening slots of the desired width between adjacent rings, and which are secured in those relative positions by being welded to generally axially extending bars on the inlet side of the screen. In an alternative construction, the screening cylinder is fabricated by spirally winding a continuous wire of the desired section with adjacent coils in the desired axially spaced relation, and again the resulting multiple loops of wire are secured together in spaced relation by welding to multiple generally axially extending bars on the inlet side of the cylinder.

Screens equipped with screening cylinders constructed as summarized in the preceding paragraph have demonstrated outstanding properties under test conditions, but practical problems have been encountered when such screening cylinders were put into regular use in a paper mill. More specifically, it appeared that under production conditions in the mill, welded connections between the wire loops and the axial bars tend to fail. While this problem might be obviated by special welding techniques, they do not necessarily lend themselves to economical fabrication conditions, and the primary objective of the present invention is to provide such screening cylinders which are of an improved construction capable of successfully withstanding all normal loads and service conditions.

In accordance with the invention, instead of fabricating the screening cylinder with its screening surface essentially continuous from one end thereof to the other, the screening cylinder of the invention comprises a plurality of groups of circular rings of the desired rod material, with the rings in each group being spaced axially of their common axis to define a corresponding plurality of screening slots between adjacent rings, and with each group spaced axially of the cylinder from the adjacent group or groups to leave a gap between adjacent groups which is of a width, measured axially of the cylinder, equal to that of several of the rings which form the screening slots.

Each of these gaps is in turn filled by an individual metal reinforcing hoop of the proper width to fill the gap except for a screening slot between each side thereof and the adjacent ring. These hoops are also preferably of substantially greater thickness, measured radially of the cylinder, than the radial dimension of the screening rods to provide these with adequate stiffness, but their inner diameter matches that of the screening rods so that they also have their inner surfaces welded to the axially extending rods to complete and reinforce the screening cylinder as a whole.

Thus the screening cylinder of the invention, in its completed form, comprises essentially a reinforcing and supporting framework consisting of a plurality of metal hoops of substantial cross-sectional dimensions, e.g. ¾ inch square, secured together in axially spaced relation by welded connections to multiple axially extending bars generally of approximately ¼ inch square section. Each of the spaces between adjacent hoops is in turn filled with a plurality of axially spaced rings of rod material which are welded to the axially extending bars in the desired slot-forming spaced relation with each other and with the reinforcing hoops.

DESCRIPTION OF THE PREFERRED EMBODIMENT

Figure 1:
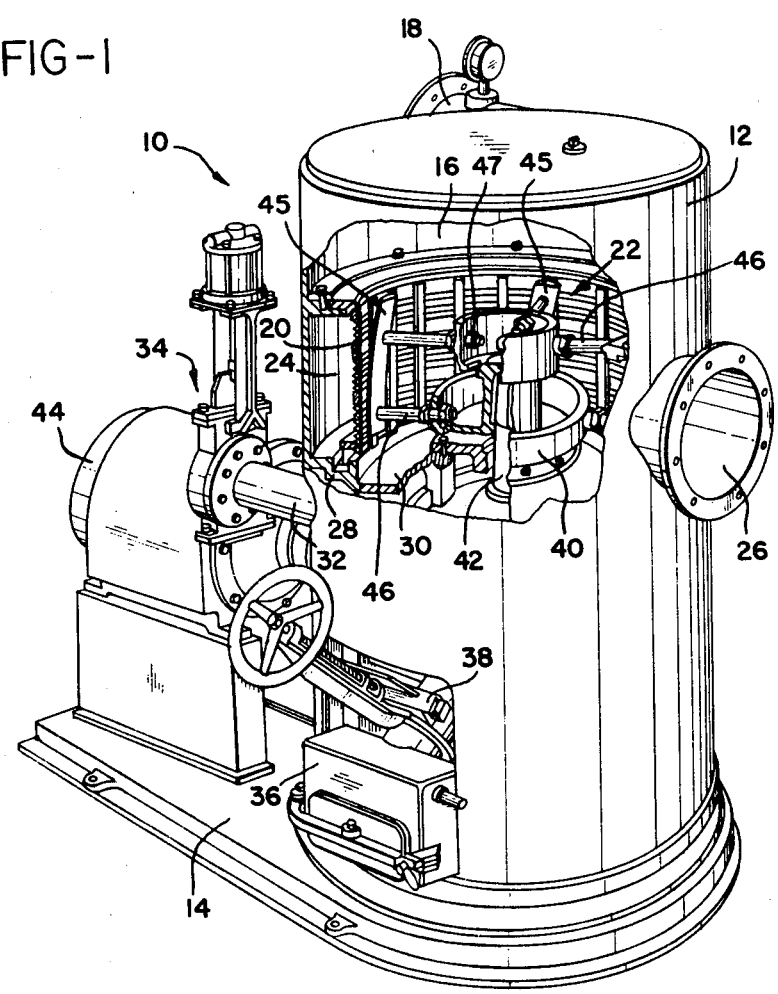
FIG. 1 is a perspective view of screening apparatus in accordance with the present invention.

The screening apparatus 10 shown in FIG. 1 is essentially the same as that shown in the above noted Chupka-Seifert U.S. Pat. No. 4,155,841 except for the incorporation of the screening cylinder of the present invention. It includes a main housing 12 on a base 14, and the inlet chamber 16 at the upper end of the housing has a tangential inlet port 18 through which the paper making stock is fed under pressure into the housing. The screening cylinder 20 is so positioned within the housing 12 that it divides the interior of the housing into a central supply or screening chamber 22 into which the stock is initially fed from the inlet chamber 16, and an accepts chamber 24 communicating with an outlet port 26.

The bottom wall 28 of the screening chamber 22 includes a trough 30 communicating with a discharge port 32 controlled by a valve assembly 34 which, as is conventional, can be preset to provide a desired continual or periodic bleed of rejects from the system. The reject particles which collect on trough 30 drop therefrom into a collection box 36 upon opening of the manually controlled valve 38.

A rotor 40 supported on a drive shaft 42 in the screening chamber 22 is driven by a motor 44 and suitable interconnecting gearing or the like. The rotor 40 carries vanes or foils 45 mounted on the ends of support rods 46 which are provided with adjustable connections 47 to position the foils as desired with respect to the inner face of the screening cylinder 20.

Figure 4:
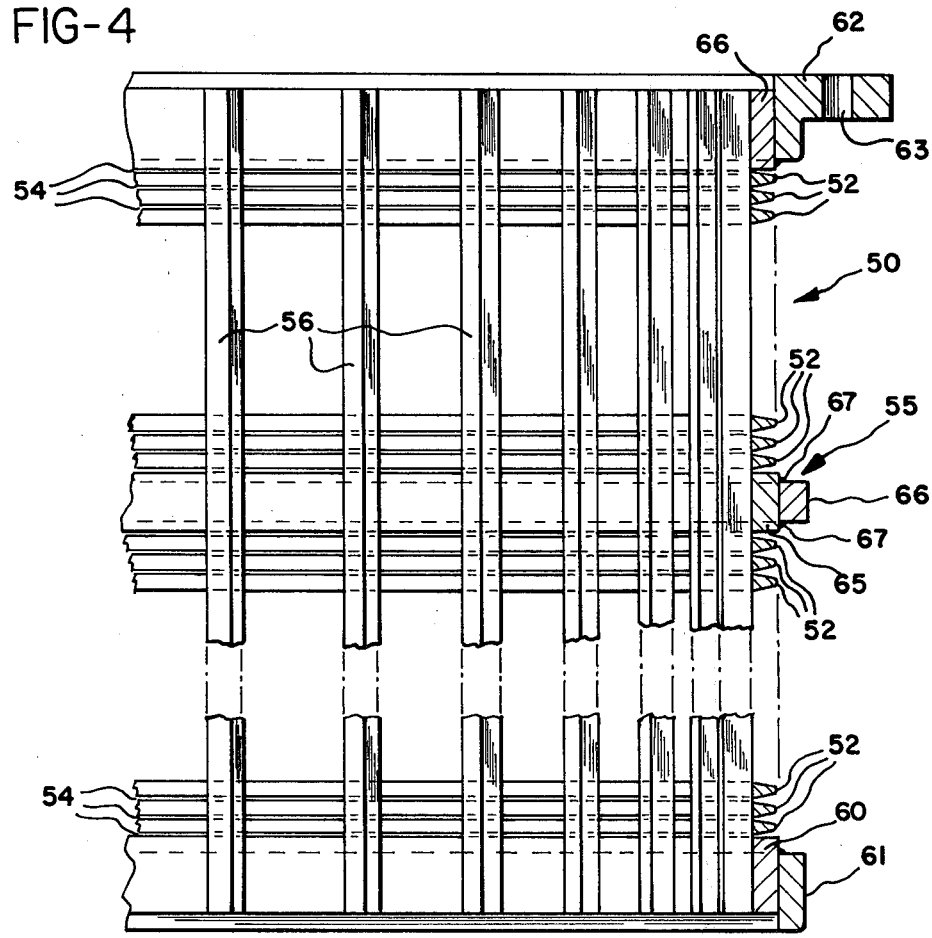
FIG. 4 is an enlarged fragmentary section of a portion of the screening cylinder showing the relationship between the circular rings and the reinforcing hoops.
Figure 2:
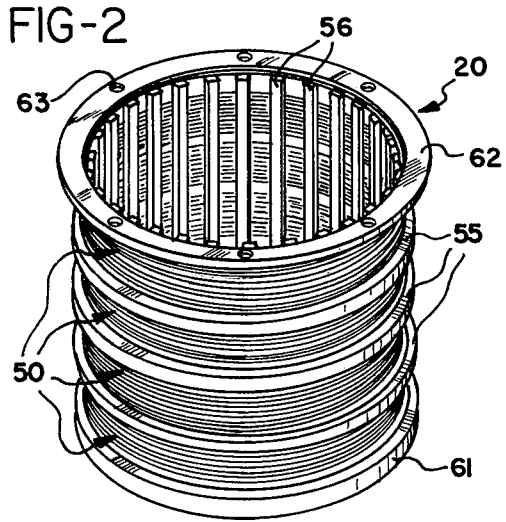
FIG. 2 is a side elevation of a screening cylinder in accordance with the present invention.
Figure 3:
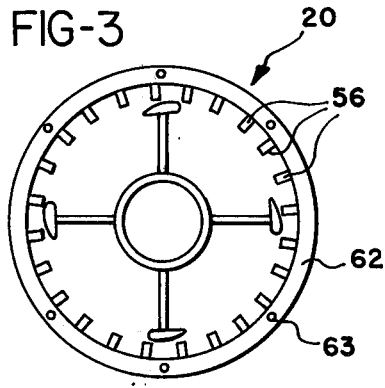
FIG. 3 is an end view of the screening cylinder of FIG. 2.

As best seen in FIGS. 2-4, the screening cylinder 20 includes a plurality of groups 50 of circular rings 52 of metal rod material which are arranged in closely spaced relation axially of the cylinder to define a corresponding plurality of circumferentially extending screening slots 54 of predetermined uniform width therebetween. As disclosed in our above-noted application Ser. No. 145,654, the preferred range of widths for the slots 54 is from 0.014 to 0.022 inch, but it may be extended to between 0.008 to 0.010 on the low side or as high as 0.030 inch. In a preferred form of the invention, the rod material 52 is generally triangular in section as shown, with a flat base of the order of 3/16 inch in width and an altitude, which establishes the wall thickness of the majority of the cylinder 20, of approximately ⅜ inch.

The groups 50 of rings 52 are spaced axially of the cylinder 20 to provide gaps at regularly spaced intervals along the length of the cylinder, and a reinforcing hoop 55 is interposed in each of these gaps and forms a part of this cylinder wall. Multiple bars 56 extend generally axially of the interior of the cylinder and are welded to the bases of the rings 52 and the hoops 55 at all their crossing points.

Preferred results have been obtained with bars 56 of square section ¼ inch on a side. The hoops 55, however, are of substantially larger section than the bars 56, and have radial and axial dimensions substantially greater than those of the rods 52, e.g. ¾ inch in both directions so that each occupies approximately the same axial space as three of the rods 52 in a preferred embodiment of the invention.

Thus the cylinder 20 comprises a reinforcing skeleton structure of multiple axially extending bars 56 welded to each of the hoops 55, e.g. twenty-four such bars and four such hoops in a preferred embodiment of the invention approximately 25 inches in diameter and 24 inches in axial length. The top and bottom of the cylinder are finished by hoops 60 which are preferably of the same radial thickness as the rods 52, e.g. ⅜ inch, but greater axial width, e.g. 1 inch.

An additional reinforcing hoop 61 is welded to the bottom hoop 60 to reinforce the bottom of the cylinder, preferred results having been obtained with the hoop 61 ½ inch thick and 1 inch wide. Similarly the top of the cylinder is finished by a retaining ring 62 which includes a peripheral mounting flange portion provided with circumferentially spaced holes 63 for receiving mounting bolts to secure the cylinder in the screen assembly of FIG. 1.

In preferred embodiments of the invention, using components of the dimensions specified above, the hoops 55 are spaced axially of the cylinder with respect to each other and to the end hoops 60 so that each of the resulting spaces between adjacent hoops will be approximately 4 inches in axially extent. The rods 52 composing each of these groups in turn will be so spaced with respect to each other and the hoops on each side of the group that there will be screening slots 54 of uniform width between adjacent rods and also between each of the end rods in the group and the adjacent hoop 55 or 60. The number and individual dimensions of rods 52 will of course vary in accordance with the desired slot widths in a screen of a standard overall length, e.g. 12 inches, 24 inches and 36 inches.

The individual groups 50 of rods 52 can be assembled and secured together in any of the ways described in the above noted Chupka-Seifert patent and application. A preferred procedure is to form the complete cylinder initially in two flat sections, each equal in length to one-half the circumference of the finished cylinder. For this procedure, it is desired to use composite hoops 55, each comprising an inner section 65 of the same radial dimensions as the rod material 52 and the end hoops 60, and an outer section 66 of slightly smaller width to facilitate welding the two sections together along the seams 67.

According to this procedure, each flat half-section will include the proper number of half-rods 52 half-hoops 60 and 66, all welded in the desired spaced relation axially of the finished cylinder to the proper number of bars 56. The two half-sections are rolled to 180° shapes and assembled around an expanding mandrel inside the complete circular outer hoop sections 65 and the end hoop 61 and each ring 62, the mandrel is then expanded to assure tight contact between each set of hoop sections 65–66 and between the end hoops 60 and the reinforcing hoop 61 and end ring 62 while these contacting parts are welded together. Thereafter, the adjacent ends of the two 180° sections are welded together to complete the cylinder.

In use, the relatively heavy hoops 55 welded to the multiple axial bars 56 tend to rigidify the cylinder structure as a whole, and thereby to minimize the transmission of vibratory stresses to the welded connections between the bars 56 and the rings 52. The number and individual dimensions of the various components of the completed cylinder are subject to variation without departing from the scope of the invention, and the numbers and dimensions given above are accordingly to be understood as designating guidelines which have been found to result in screening cylinders of highly superior characteristics.

While the forms of apparatus herein described constitute preferred embodiments of the invention, it is to be understood that the invention is not limited to these precise forms of apparatus, and that changes may be made therein without departing from the scope of the invention.

What is claimed is:

1. A screening cylinder for use in pressure screening apparatus for removing contaminant particles from paper making stock and comprising a housing adapted to receive said cylinder and to have the interior thereof partitioned by said cylinder into a supply chamber and an accepts chamber respectively within and without said cylinder, and further comprising rotor means operative to circulate the stock to be screened within said supply chamber, said screening cylinder comprising:
   (a) a plurality of groups of circular rings of metal rod material defining a corresponding plurality of sections of the wall of said cylinder,
   (b) said rings in each said group being arranged in closely spaced relation axially of said cylinder to define a corresponding plurality of circumferentially extending screening slots of predetermined uniform width therebetween,
   (c) a plurality of metal bars of rectangular section extending generally lengthwise of said cylinder in uniformly circumferentially spaced relation around the interior of said cylinder and welded to each of said rings to maintain said rings in said axially spaced relation thereof,
   (d) said groups of rings being spaced axially of said cylinder to provide a corresponding plurality of gaps therebetween traversed by said bars,
   (e) a cylindrical metal hoop having a flat inner surface interposed in each of said gaps in encircling relation with said bars and having the same inner diameter as said rings, and
   (f) said hoops being welded to the portions of said bars which traverse said gaps to reinforce said cylinder as a whole.

2. A screening cylinder as defined in claim 1 wherein said gaps and said hoops are dimensioned to provide a slot adjacent each side of each of said hoops of the same width as said slots between adjacent said rings.

3. A screening cylinder as defined in claim 1 wherein each of said rings has a flat side and is oriented to present said flat side of the inside of said cylinder, said flat sides of said rings being welded to said bars.

4. A screening cylinder as defined in claim 1 wherein said rings are generally isoceles triangle shaped in section with the bases thereof defining the interior of said cylinder to present flat surfaces welded to said bars.

5. A screening cylinder as defined in claim 1 wherein the axial thickness of each of said hoops is at least of the order of twice the axial dimension of said rod material.

* * * * *